H. D. COHEN.
AUTOMOBILE HEADLIGHT GLASS.
APPLICATION FILED JULY 27, 1916.
1,213,154.
Patented Jan. 23, 1917.
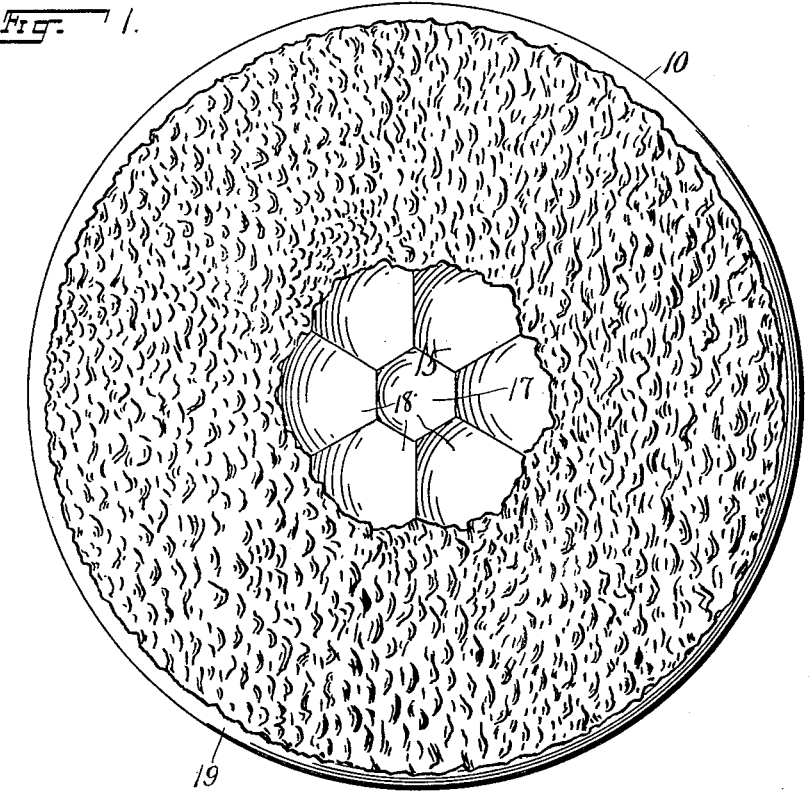
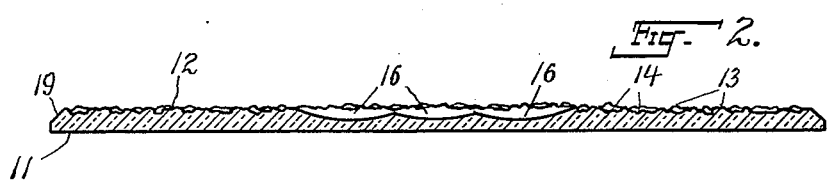
INVENTOR
Henry D. Cohen
BY
Dyke & Canfield, his
ATTORNEYS

UNITED STATES PATENT OFFICE.

HENRY D. COHEN, OF NEWARK, NEW JERSEY.

AUTOMOBILE-HEADLIGHT GLASS.

1,213,154.

Specification of Letters Patent.

Patented Jan. 23, 1917.

Application filed July 27, 1916. Serial No. 111,546.

*To all whom it may concern:*

Be it known that I, HENRY D. COHEN, a citizen of the United States, and a resident of Newark, county of Essex, and State of New Jersey, have invented certain new and useful Improvements in Automobile-Headlight Glasses, of which the following is a specification.

My invention relates to glasses for automobile headlights and is particularly designed to provide a glass for the headlights of automobiles which will prevent objectionable glare and at the same time will not interfere with the lighting of the roadway in an efficient manner.

The object of the invention is to provide an automobile headlight glass which may be cheaply and inexpensively manufactured and which, while permitting the proper illumination of the road, will not produce such a glare as to blind or cause optical discomfort or inconvenience to one looking at the headlight from the front.

With the foregoing and related objects in view, my invention consists in the structure, improvements and combinations herein set forth and claimed.

In the accompanying drawing, forming a part of this specification, Figure 1 is a rear view of a headlight glass embodying my invention, and Fig. 2 is a central cross-sectional view thereof.

Reference numeral 10 indicates the glass as a whole, 11 the front face and 12 the rear face thereof. The glass may have any desired form, but is ordinarily circular as shown. The front face 11 is smooth and polished and preferably slightly wavy and the rear face 12 which comes next to the light is, for the greater part, provided with elevations 13 and depressions 14 forming an irregular surface without, however, interfering to any considerable extent with the transparency of the glass. These irregularities in the rear surface of the glass serve to scatter the rays of light so that when viewed from the front the glass appears to be substantially evenly illuminated and all blinding effects are avoided. This effect is increased by the slight waves of the front surface.

At or about the center of the glass a clear space, indicated generally by the reference numeral 15, is provided. In order to prevent unduly bright rays passing through this substantially completely transparent portion and to break up the rays somewhat, the rear surface thereof is formed so as to form a plurality of plano-concave lenses, that is to say, the smooth polished surface on the front of the glass forms the substantially plane face of the lenses, and the concave grounded out portion 16 forms the concave surface of such lenses. I prefer to carry out the grinding or other formation of the lenses, as by molding or the like, in such manner that these concave lenses make up substantially a rosette, that is to say, an inner substantially central grinding 17 may be made, and this may be surrounded with substantially concentrically arranged concave ground out portions 18. Such arrangement of the plano-concave lenses, however, may be varied, and a large number of designs may be produced without departing from my invention. The lenses are preferably annealed or otherwise suitably treated to withstand heat and vibration without cracking or breaking.

With a headlight glass in accordance with my invention, the rays striking the irregular surface 13 pass therethrough to illuminate the road, but are so scattered as to avoid all glare, and the substantial direct rays passing through the substantially completely transparent portion 16, while serving to give abundant illumination directly ahead where there is the greatest need, nevertheless are scattered and broken up by the plano-concave lenses, though such scattering and breaking up is in somewhat less degree than in the neighborhood of the irregular surface portion surrounding this part of the glass. A bevel 19 may be ground on the outer periphery of the glass at the rear side thereof to smooth the irregular surface at this region so that the glass may be securely held and fastened in place in the lamp.

Headlight glasses produced in accordance with my invention may be manufactured very inexpensively, are strong and substantial, may be readily cleaned, as the outer surface is smooth and polished, and dust does not readily collect thereon, and furnish in every way an extremely desirable article for the purpose.

Having thus described my invention, I claim:

1. A glazing for dimming headlights, comprising a relatively small central portion composed of a cluster of transparent plano-concave lenses and a surrounding annular translucent portion.

2. A glazing for dimming headlights comprising a relatively small central portion composed of a cluster of transparent plano-concave lenses arranged concentrically and constructed to form substantially a rosette, and a surrounding annular translucent portion.

In testimony that I claim the foregoing, I have hereto set my hand, this 26th day of July, 1916.

HENRY D. COHEN.